2 Sheets—Sheet 1.

A. WALD.
CAR-COUPLING.

No. 181,807. Patented Sept. 5, 1876.

Attest:
H. L. Perrine.
Jas. Thompson.

Inventor.
Andrew Wald
By: S. E. Somes & Co.
Attorneys

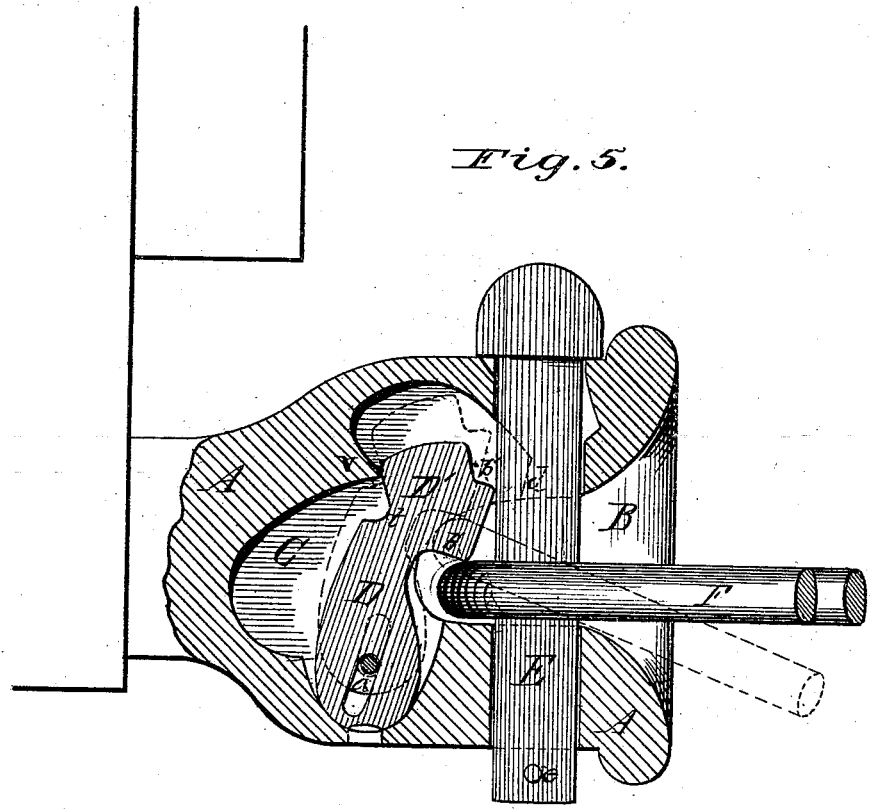

UNITED STATES PATENT OFFICE.

ANDREW WALD, OF DAVENPORT, IOWA.

IMPROVEMENT IN CAR-COUPLINGS.

Specification forming part of Letters Patent No. 181,807, dated September 5, 1876; application filed August 11, 1876.

*To all whom it may concern:*

Be it known that I, ANDREW WALD, of Davenport, in the county of Scott, and in the State of Iowa, have invented a new and useful Improvement in Car-Couplings; and I do hereby declare that the following is a full, clear, and exact description thereof, reference being had to the accompanying drawings, forming a part of this specification.

My invention relates to automatic car-couplings in which a link and pins are employed; and it consists in certain improvements, hereinafter described, whereby the several parts of the coupling, as the cars are uncoupled, will adjust themselves and be held in the position best suited to the automatic coupling of the cars as the same are run together, the object being to provide a coupling which shall be simple in its construction and reliable in its operation.

Figure 1:
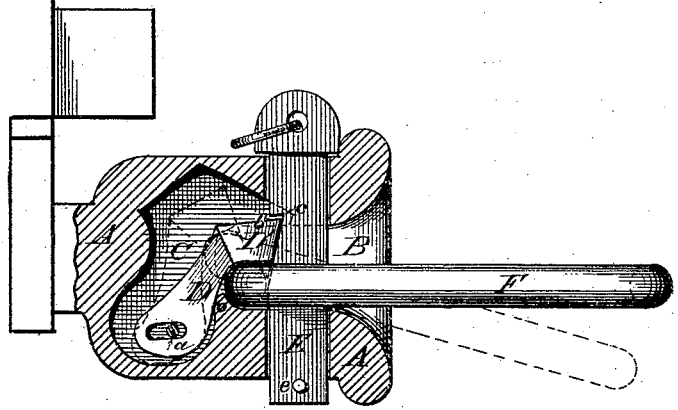
Figure 2:
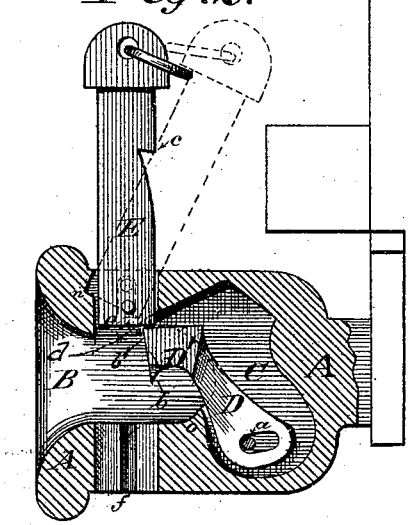
Figure 3:
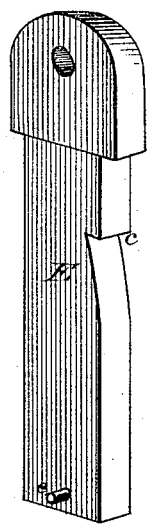
Figure 4:
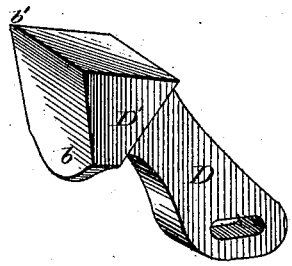

Figure 1 represents a vertical longitudinal section of the draw-head, showing the link inserted and held in a horizontal position by means of the dog and coupling-pin. Fig. 2 represents a similar section of a draw-head, with the link withdrawn and the coupling-pin partially withdrawn and resting on the dog. Fig. 3 represents a perspective view of the coupling-pin. Fig. 4 is a similar view of the latch or dog.

In the drawings, A represents the draw-head, provided with the usual cavity or mouth B, into which the coupling-link enters. Immediately behind the cavity B, and opening into the same, is an angular space or cavity, C, in which is a dog, D, which is simply placed therein or hung loosely on a pin, a, which passes through a slot in the tail thereof. This dog D operates in connection with the coupling-pin E to hold the coupling-link F while the same extends from the draw-head, when the cars are uncoupled, in a horizontal plane, ready to meet and project directly into the mouth of the corresponding draw-head, with which it is to couple. The dog also serves as a rest for the coupling-pin when the latter is withdrawn from the mouth B and in position for effecting the operation of coupling automatically. The dog D has an angular or wedge-shaped head, D', provided with a tooth, b, for griping the end of the link, and the angular projection b', which locks into the notch c in the coupling-pin E. The head D' acts as a weight, causing the dog to fall forward for the support of the coupling-pin when the link is withdrawn, and to lock with the pin when the coupling operation is effected. When supporting the pin, the upper portion of the forward end of the dog rests against a shoulder, d, in the draw-head. The coupling-pin E is shown as square or rectangular in form, and is provided near its lower end with lugs e, which slide in vertical grooves f in the sides of the pin-hole. These grooves do not extend to, but stop near, the top of the pin-hole, and form shoulders, with which the lugs e come in contact when the coupling-pin is drawn up, as shown in dotted lines, Fig. 2, and thus the said pin is prevented from being entirely withdrawn from the draw-head.

The operation is as follows: The parts being in the position shown in Fig. 2, the entering link pushes back the dog D as the cars come together, letting fall the coupling-pin E, which latter passes through the link. Then the weighted end of the dog D causes it to fall forward against the pin, the projection b' entering under the shoulder of the notch c, and locking therewith, while the tooth b gripes the end of the link. When it is desired to uncouple the cars, the pin of one of the connected draw-heads is raised, at the same time partially raising the head of the dog, which latter, when the pin is drawn up sufficiently, falls forward and supports the pin before the cars are separated and the coupling-link withdrawn, and when the cars move apart, the coupling-link is drawn out without disturbing the support of the coupling-pin.

The cavity C is made to conform to the conformation of the dog D, and gives it proper play and rests. The cavity B does not extend beyond a point necessary to admit the link into the draw-head in order to insert the pin. A shoulder, o, is formed, against which the coupling-link strikes after forcing back the dog on entering; and in case the dog gets broken, the draw-head may be used for coupling, in the ordinary manner, since the coupling-link cannot go back any farther when the dog is removed than when in its place. A notch, n, is provided in the draw-head, near the top of the pin-hole, in which the coupling-pin may rest, as shown in dotted lines, Fig. 2, when the dog is not in use.

In Fig. 5 I have shown a modification of my invention, wherein I dispense with the notch in the coupling-pin, and change somewhat the form of the dog and its cavity. The head D' has a recess, $t$, and a projection, $v$, formed in the draw-head, tends to hold the weight of the dog in a position to bear upon the end of the link. In case the latter assumes an inclined position downward, a slight jar will be sufficient to cause the link to assume a horizontal position.

I claim as my invention—

The combination, substantially as described, of the draw-head A, weighted dog D, having projection $b'$ and tooth $b$, and coupling-pin E, the several parts being designed to operate in connection with the coupling-link, as set forth.

The above specification signed by me this 1st day of August, 1876.

ANDREW WALD.

Witnesses:
L. S. VIELE,
H. BERG.